(12) United States Patent
Matsumoto et al.

(10) Patent No.: US 7,573,378 B2
(45) Date of Patent: Aug. 11, 2009

(54) BRAKE LIGHT SYSTEM FOR VEHICLE

(75) Inventors: Yoshiyuki Matsumoto, Wako (JP); Masaaki Abe, Wako (JP); Yuji Kuwashima, Wako (JP); Mari Sakamoto, Wako (JP); Hirosni Uematsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 11/661,787

(22) PCT Filed: Sep. 26, 2005

(86) PCT No.: PCT/JP2005/018224

§ 371 (c)(1),
(2), (4) Date: Mar. 1, 2007

(87) PCT Pub. No.: WO2006/035957

PCT Pub. Date: Apr. 6, 2006

(65) Prior Publication Data

US 2008/0094200 A1 Apr. 24, 2008

(30) Foreign Application Priority Data

Sep. 27, 2004 (JP) ............................. 2004-279114

(51) Int. Cl.
*B60Q 1/44* (2006.01)

(52) U.S. Cl. .................. 340/479; 340/467; 340/468
(58) Field of Classification Search ............... 340/463, 340/464, 467, 468, 471, 475, 478, 479; 362/465, 362/466, 540, 541
See application file for complete search history.

(56) References Cited

U.S. PATENT DOCUMENTS

| 4,149,141 A | * | 4/1979 | Tanimura ................ 340/464 |
| 5,448,456 A | * | 9/1995 | Huynh ................... 362/540 |
| 5,642,094 A | * | 6/1997 | Marcella ................ 340/479 |
| 6,100,799 A |   | 8/2000 | Fenk |
| 6,902,307 B2 | * | 6/2005 | Strazzanti .............. 362/541 |

FOREIGN PATENT DOCUMENTS

| DE | 197 38 767 A1 | 3/1999 |
| GB | 2 382 404 A | 5/2003 |
| GB | 2 401 493 A | 11/2004 |

* cited by examiner

*Primary Examiner*—Van T. Trieu
(74) *Attorney, Agent, or Firm*—Birch, Stewart, Kolasch & Birch, LLP

(57) ABSTRACT

A vehicle brake light system includes a plurality of lighting units arranged in a horizontally and vertically spaced apart relation on the rear of a vehicle. Horizontally spaced apart lighting units which are lower in position have a greater distance between their centers of gravity, and are adapted to be turned on when a larger braking force is applied to a brake pedal.

18 Claims, 8 Drawing Sheets

(a)    (b)

BRAKE LIGHT SYSTEM FOR VEHICLE

TECHNICAL FIELD

The present invention relates generally to a brake or stop light system for a vehicle and, more particularly, to a brake light system for a vehicle, such as a four- or two-wheeled motor vehicle, which makes a vehicle behind aware of its approach to a vehicle ahead in accordance with the degree in which the brake pedal in the latter is pressed.

BACKGROUND ART

A switch (SW) for detecting the operation of the brake is usually installed in the vicinity of the brake pedal in a motor vehicle, so that when the brake pedal is stepped on by the driver, the SW may be energized (or de-energized) to turn on the brake lights.

It has hitherto been the case that the brake lights are turned on or off in response to the operation of the brake (ON) or its release (OFF) by the driver.

Measures other than the ordinary brake lights have been proposed to prevent the collision of a vehicle with a vehicle, etc. ahead from behind. For example, JP-A-2002-6035 discloses a system including a radar apparatus mounted on a motor vehicle for determining the distance between two vehicles and the relative speed thereof as required to give a warning or have the brake operated automatically on behalf of the driver when the vehicle has come too close to the vehicle ahead.

The prediction of possibility of any collision based on outside pictures taken by a radar or onboard camera is very expensive because of the radar or camera and control devices therefor which it requires. The brake lights presently available reflect only the presence or absence (ON/OFF) of brake operation and do not reflect at all the effects exerted by brake operation on the vehicle or its surroundings, or the importance thereof.

DISCLOSURE OF THE INVENTION

In view of the foregoing problem, it is an object of the present invention to provide a vehicular brake light system which makes a behind-vehicle aware of its approach to an ahead-vehicle in accordance with the degree of press of a brake pedal.

According to a first aspect of this invention, there is provided a vehicle brake light system including a plurality of lighting units arranged in a horizontally and vertically spaced apart relation on the rear of a vehicle, characterized in that horizontally spaced apart lighting units which are lower in position have a greater distance between their centers of gravity, and are adapted to be turned on when a larger braking force is applied to a brake pedal.

According to another aspect of this invention, there is provided a vehicle brake light system including a plurality of lighting units arranged in a vertically spaced apart relation on the rear of a vehicle, characterized in that a lighting unit which is lower in position has a larger area, and is adapted to be turned on when a larger braking force is applied to a brake pedal.

The brake light system preferably has all of its lighting units turned on when the braking force has exceeded a given value.

The brake light system may further include a normally-on brake light which is turned on whenever the braking force is applied to the brake pedal.

According to still another aspect of this invention, there is provided a control apparatus for a vehicle brake light system including a plurality of lighting units arranged in a horizontally and vertically spaced apart relation on the rear of a vehicle, horizontally spaced apart lighting units which are lower in position having a greater distance between their centers of gravity, the control apparatus being characterized by including braking force detecting means for detecting at least one of a brake stepping force, a braking pressure and the amount of pedal operation, operating means for producing a signal altered progressively in accordance with the braking force as detected by the braking force detecting means, and lighting unit control means for controlling the turning on and off of the lighting units in accordance with the signal produced by the operating means, so that the lighting units which are lower in position may be turned on when the braking force becomes larger.

According to still another aspect of this invention, there is provided a control apparatus for a vehicle brake light system including a plurality of lighting units arranged in a vertically spaced apart relation on the rear of a vehicle so that one which is lower in position may have a larger area, the control apparatus being characterized by including braking force detecting means for detecting at least one of a brake stepping force, a braking pressure and the amount of pedal operation, operating means for producing a signal altered progressively in accordance with the braking force as detected by the braking force detecting means, and lighting unit control means for controlling the turning on and off of the lighting units in accordance with the signal produced by the operating means, so that a lighting unit which is lower in position may be turned on when the braking force becomes larger.

The operating means preferably produces a signal for turning on all of the lighting units when the braking force has exceeded a given value.

The operating means desirably produces a signal for turning on a normally-on brake light whenever the braking force is applied to the brake pedal.

According to a further aspect of this invention, there is provided a vehicle brake light system control program for having a lighting control apparatus control a vehicle brake light system having a plurality of lighting units arranged in a horizontally and vertically spaced apart relation on the rear of a vehicle so that horizontally spaced apart lighting units which are lower in position may have a greater distance between their centers of gravity, characterized by including a process for having braking force detecting means detect at least one of a brake stepping force, a braking pressure and the amount of pedal operation, a process for having operating means produce a signal altered progressively in accordance with the braking force as detected by the braking force detecting means and a process for having lighting unit control means control the turning on or off of the lighting units in accordance with the signal produced by the operating means, so that the lighting unit which is lower in position may be turned on as the braking force becomes larger.

According to a still further aspect of this invention, there is provided a vehicle brake light system control program for having a lighting control apparatus control a vehicle brake light system having a plurality of lighting units arranged in a vertically spaced apart relation on the rear of a vehicle so that one which is lower in position may have a larger area, characterized by including a process for having braking force detecting means detect at least one of a brake stepping force, a braking pressure and the amount of pedal operation, a process for having operating means produce a signal altered progressively in accordance with the braking force as detected by the braking force detecting means and a process for having lighting unit control means control the turning on or off of the lighting units in accordance with the signal produced by the operating means, so that the lighting unit which is lower in position may be turned on as the braking force becomes larger.

The program preferably includes a process for having the operating means produce a signal for turning on all of the lighting units when the braking force as obtained by the braking force detecting means has exceeded a given value.

The program desirably includes a process for having the operating means produce a signal for turning on a normally-on brake light whenever the braking force is applied to the brake pedal.

BRIEF DESCRIPTION OF THE DRAWINGS

Certain preferred embodiments of this invention will now be described, by way of example only, with reference to the accompanying drawings, in which.

BEST MODE OF CARRYING OUT THE INVENTION

Figure 1:
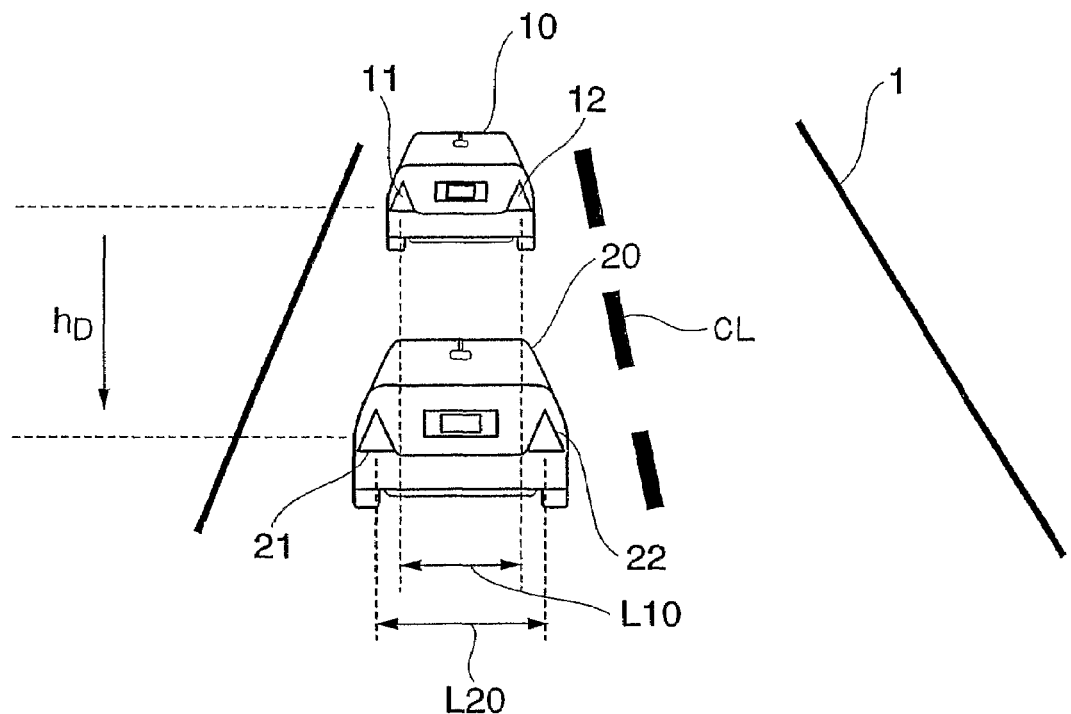
FIG. 1 is a schematic diagram showing the principle of a vehicle brake light system according to this invention.

Initial reference is made to FIG. 1 diagrammatically showing two motor vehicles of the same type running on a left side of a centerline CL of a road 1 and seen from behind, a vehicle 10 ahead and a vehicle 20 behind.

In FIG. 1, the vehicle 10 ahead has brake lights 11 and 12 and the vehicle 20 behind has brake lights 21 and 22. On real vehicles, the brake lights 11 and 12 are installed in the same positions as the brake lights 21 and 22, and have the same height above the road surface, the same brake light spacing and the same brake light area.

However, when the driver of a third car see the brake lights of the two cars 10 and 20 ahead, the lights on the nearer car appear to be lower in height, have a wider spacing therebetween and a larger area, as shown in FIG. 1. More specifically, the brake lights 21 and 22 on the vehicle 20 behind appear to be lower by a height indicated by a symbol hD than the brake lights 11 and 12 on the vehicle 10 ahead. The brake lights 21 and 22 on the vehicle 20 behind have therebetween an apparent spacing L20 which is larger than the apparent spacing between the brake lights 11 and 12 on the vehicle 10 ahead. Moreover, the brake lights 21 and 22 on the vehicle 20 behind have each an apparent area which is larger than the apparent area of each of the brake lights 11 and 12 on the vehicle 10 ahead.

Figure 2:
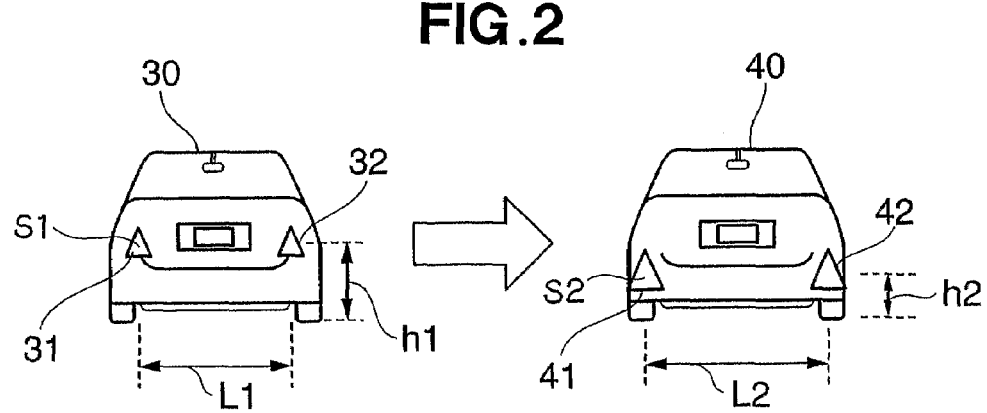
FIG. 2 is a schematic illustration of two motor vehicles of the same type having differently positioned brake lights.

These facts are utilized to change right and left brake lights installed toward the upper portion of a vehicle and having a short distance between their centers of gravity and a small light-emitting area to ones installed toward the lower portion of a vehicle and having a long distance between their centers of gravity and a large light-emitting area, as shown in FIG. 2, so that the driver of a vehicle at a constant distance from a vehicle ahead may even consider their distance as becoming shorter, and thereby become more careful about the vehicle ahead.

FIGS. 2 (a) and (b) are diagrams showing vehicles of the same type as those shown in FIG. 1, having brake lights installed in different positions, as seen from behind. FIG. 2(a) shows a vehicle 30 having brake lights 31 and 32 installed thereon and FIG. 2(b) shows a vehicle 40 having brake lights 41 and 49 installed thereon. The brake lights 31 and 32 have a height shown as h1 above the road surface and a spacing shown as L1 therebetween. The brake lights 41 and 42 have a height shown as h2 above the road surface and a spacing shown as L2 therebetween. Their areas are shown as S1 and S2. They satisfy the relationships h1>h2, L1<L2 and S1<S2.

Figure 3:
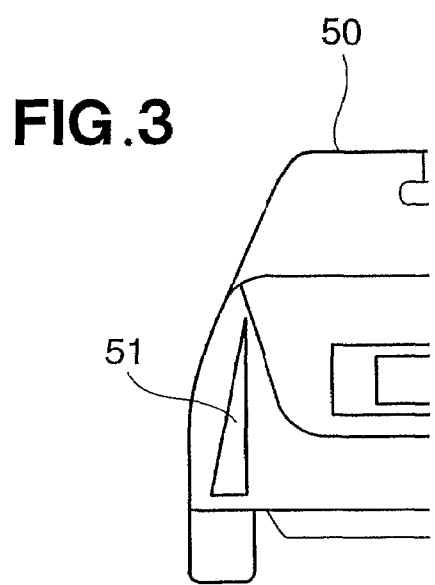
FIG. 3 is an external diagram showing the vehicle brake light system according to this invention.
Figure 4:
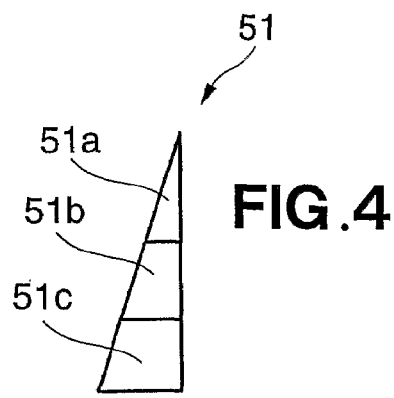
FIG. 4 is a diagram showing the vehicle brake light system according to this invention.

FIGS. 3 and 4 are an external view of a vehicle showing a vehicle brake light based on the above principle according to this invention and a diagram showing the brake light alone, respectively. The vehicle 50 has a triangular brake light 51 installed thereon, as shown in FIG. 30. The brake light is divided in a plurality of lighting units 51a, 51b and 51c as shown in FIG. 4. The lighting units 51a, 51b and 51c are arranged in a vertical array, increase in area in the downward direction and extend laterally of the vehicle, so that right and left lighting units may have therebetween a spacing increasing in the downward direction. (Although the example shows the brake light divided in three portions, the number thereof is not limitative.)

Figure 5:
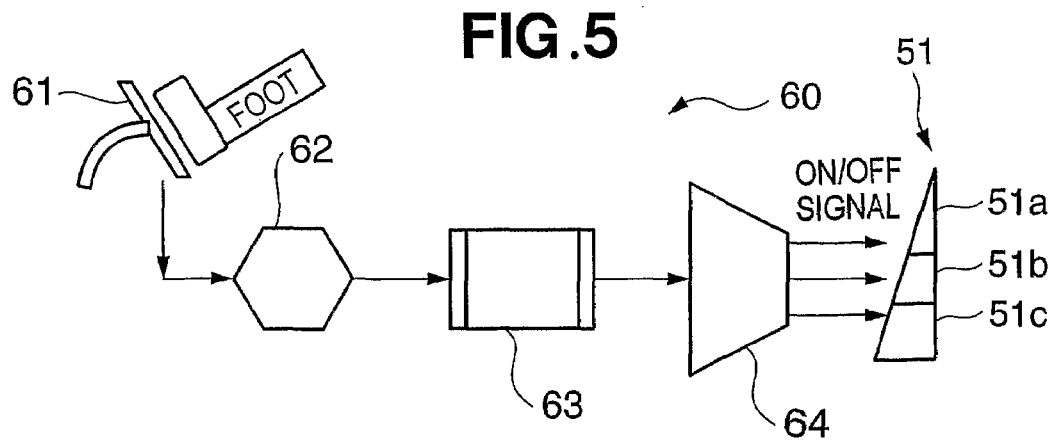
FIG. 5 is a block diagram showing the principle of the system.

According to this example, the brake light and a brake stepping force sensor are used to constitute a system as shown in FIG. 5. This system is a control apparatus for the vehicle brake light 51 composed of a plurality of lighting units 51a, 51b and 51c so arranged in a vertical array as to have a larger distance between the centers of gravity of right and left brake lights and a larger area in the downward direction, as shown in FIGS. 3 and 4. The control apparatus 60 for the vehicle brake light 51 is composed of a brake stepping force sensor 69, an operating device 63 and a lighting unit control device 64.

The brake stepping force sensor 62 detects the brake stepping force for a brake pedal 61. The operating device 63 sends a signal altered in magnitude progressively in accordance with the brake stepping force as detected by the brake stepping force sensor 62. The lighting unit control device 64 controls the turning on or off of the lighting units 51a, 51b and 51c in accordance with the signal sent from the operating device 63. The control apparatus 60 controls the lighting units so that the greater the degree in which the brake pedal 61 is stepped on, the lower in position of the lighting units may be turned on.

A process for controlling the brake lights by this system comprises a brake stepping force detecting step, an operating step and a lighting unit control step. The brake stepping force detecting step makes the brake stepping force sensor 62 detect the brake stepping force applied to the brake pedal 61 by the brake operation of the driver. The operating step makes the operating device 63 send a signal altered in magnitude progressively in accordance with the brake stepping force as detected by the brake stepping force sensor 62 during the brake stepping force detecting step. The lighting unit control step controls the turning on or off of the lighting units 51a, 51b and 51c in accordance with the signal sent from the operating step by the operating device 63. These steps enable the lower in position of the lighting units to be turned on with an increase in the degree in which the brake pedal is stepped on.

Figure 6:
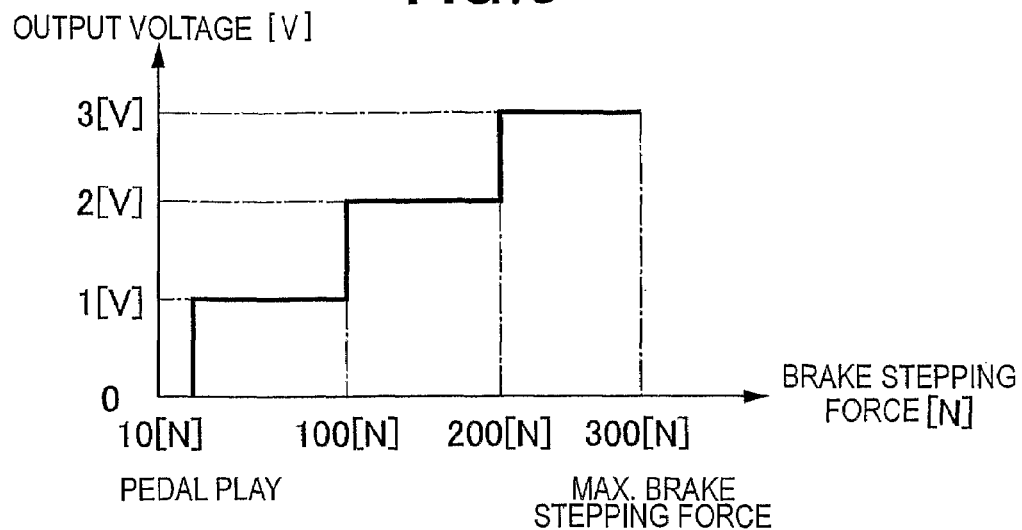
FIG. 6 is a graph showing the output voltage of the operating station.

FIG. 6 is a graph showing a voltage signal output by the operating device 63 in response to the brake stepping force as detected by the brake stepping force sensor 62. The horizontal axis represents the brake stepping force and the vertical axis represents the output voltage. The output voltage is zero when the brake stepping force is from 0 to 10 N. This is a range for the play of the brake pedal. The output voltage is 1 V when the brake stepping force is from 10 to 100 N. The output voltage is 2 V when the brake stepping force is from 100 to 200 N. The output voltage is 3 V when the brake stepping force is from 200 N or above. Incidentally, the brake under description exhibits its maximum braking force with a stepping force of 300 N. A pedal stepping force up to 10 N is regarded as falling within the range of play for the pedal, as shown in FIG. 6, and is not regarded as signaling any brake operation. FIG. 6 shows the output voltage so set as to rise progressively (meaning a greater influence given by brake operation to the surroundings) with an increase in brake stepping force. The operating device 63 stores the graph of FIG. 6 as a map and outputs by using the map a voltage signal corresponding to the input braking force.

The lighting unit control device 64 stores the correlations as shown in Table 1.

TABLE 1

| Input voltage [V] | Lighting unit 51a | Lighting unit 51b | Lighting unit 51c |
|---|---|---|---|
| 0.5 - 1.5 [V] | ON | OFF | OFF |
| 1.5 - 2.5 [V] | OFF | ON | OFF |
| 2.5 - [V] | OFF | OFF | ON |

Referring to the correlations shown in Table 1, the lighting unit 51a is turned on, while the lighting units 51b and 51c are turned off, when the input voltage is from 0.5 to 1.5 V. When the input voltage is from 1.5 to 2.5 V, the lighting unit 51a is turned off, the lighting unit 51b is turned on and the lighting unit 51c is turned off. When the input voltage is 2.5 V or above, the lighting units 51a and 51b are turned off, while the lighting unit 51c is turned on. The lighting unit control device 64 turns on the lighting unit as selected from the correlations shown in Table 1 in response to each input voltage signal. As is obvious from Table 1, the lighting unit which is turned on is so set as to change in the order of 51a→51b→51c with an increase in braking force. As can be readily appreciated by a skilled artisan, other lighting patterns may be employed. For example, when a braking force is small, the lighting unit 51a may be turned on, while the lighting units 51a and 51b may be turned on when a braking force is medium. When a braking force is large, all the lighting units 51a, 51b, 51c may be turned on.

Figure 7:
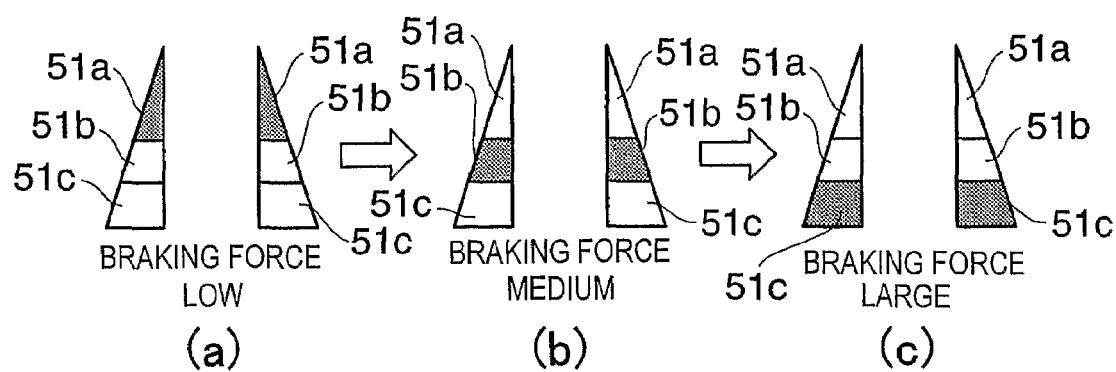
FIG. 7 is an illustration of the lighting patterns of brake lights.

FIG. 7 is a diagram showing the light-emitting patterns of the brake lights. When the braking force is low, the lighting units 51a situated at the top and having a narrow spacing and a small area are turned on, as shown at (a). When the braking force is medium, the lighting units 51b situated in the middle and having a spacing wider than at the top, but narrower than at the bottom, and an area larger than at the top, but smaller than at the bottom are turned on, as shown at (b). When the braking force is large, the lighting units 51c situated at the bottom and having the widest spacing and the largest area are turned on, as shown at (c).

When the light-emitting patterns are set as shown in FIG. 7, an increase in braking force brings about a downward shift of the centers of gravity of the lighting units, an outward shift of the centers of gravity of the right and left brake lights and an increase in area of the brake lights. The use of the brake lights and their controls as described gives the light-emitting patterns which make the driver of a car aware more strongly of its approach to a car ahead with an increase of the force applied to brake the latter, since the lighting units of the brake lights shift down and have a wider horizontal spacing between their centers of gravity and a larger area. According to the example under description, the lighting units so arranged as to have an area increasing downwardly makes the driver aware still more strongly of his approach to the car ahead. That is because the nearer any object, the larger it looks. A brake pressure can be detected from the liquid pressure of the brake system and employed as the braking force instead of the brake stepping force to control the brake lights. The degree in which the brake pedal is operated can also be employed instead of the brake stepping force to control the brake lights.

EMBODIMENTS

Figure 8:
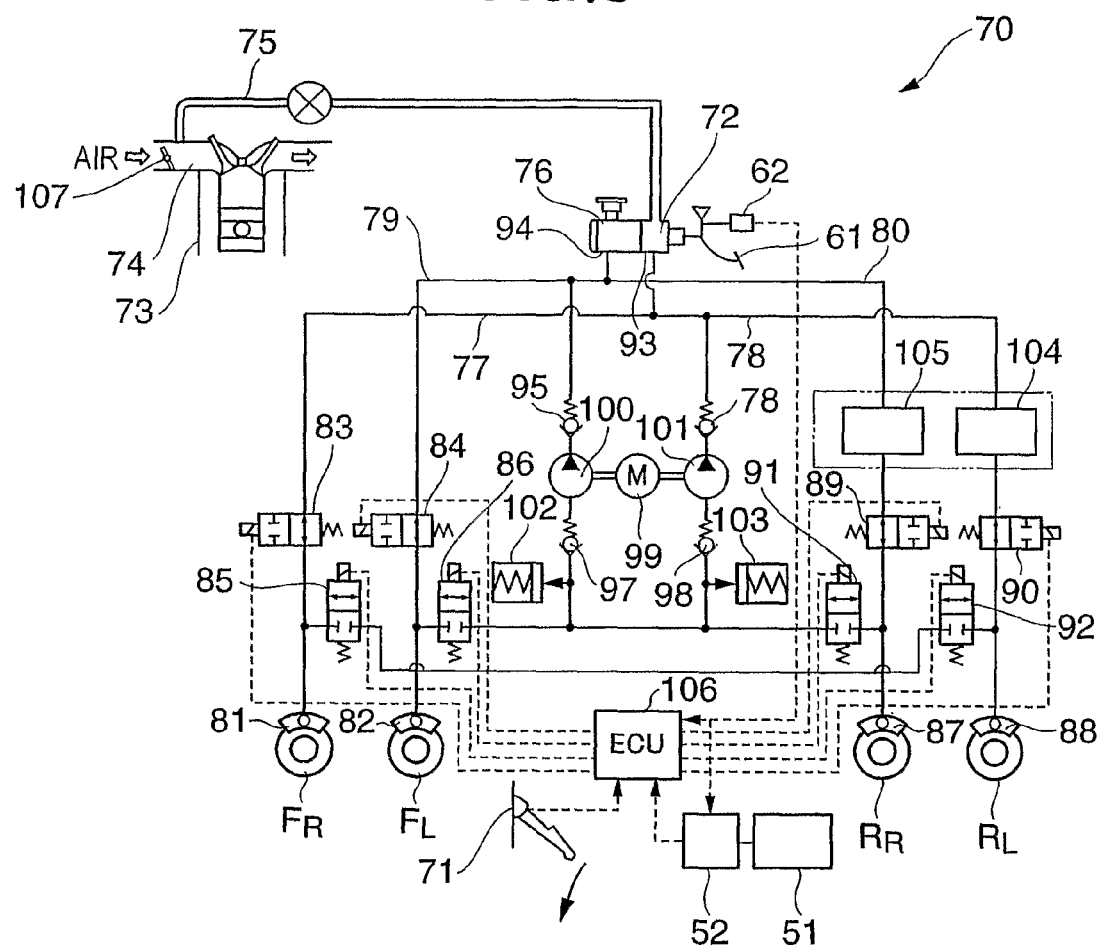
FIG. 8 is a circuit diagram for a brake light apparatus according to one embodiment of this invention.

FIG. 8 is a diagram showing the construction of a brake light system according to one embodiment of this invention. A brake system 70 includes a brake pedal 61 and an accelerator pedal 71 which are installed in a car compartment for operation by the driver. The brake pedal 61 is provided with a brake stepping force sensor 62 for detecting a brake stepping force. The accelerator pedal 71 is provided with a sensor for detecting if the accelerator pedal 71 is stepped on. The brake pedal 61 is connected to a brake booster 72. A negative pressure generated in the intake manifold 74 of an internal combustion engine 73 is supplied to the brake booster 72 through a pressure conduit 75. This negative pressure enables the brake booster 72 to produce a multiplied auxiliary force corresponding to the stepping force on the brake pedal 61.

A master cylinder 76 produces a master cylinder pressure Pm corresponding to the combined force of the brake stepping force and the auxiliary forced of the brake booster 72. The master cylinder pressure Pm is supplied to liquid pressure lines 77, 78, 79 and 80 corresponding to four tires FR, FL, RR and RL to give a braking force to the tires.

Wheel cylinders 81 and 82 giving a braking force to the tires FR and FL are connected to normally open solenoid valves 83 and 84, respectively, and normally closed solenoid valves 85 and 86, respectively. Wheel cylinders 87 and 88 giving a braking force to the tires RR and RL are connected to normally open solenoid valves 89 and 90, respectively, and normally closed solenoid valves 91 and 92, respectively.

The master cylinder 76 is of the tandem type and has an output port 93 connected to the liquid pressure lines 77 and 78 and an output port 94 connected to the liquid pressure lines 79 and 80.

The brake system 70 further has discharge valves 95 and 96, intake valves 97 and 98, a motor 99, pumps 100 and 101, auxiliary reservoirs 102 and 103 and proportional pressure reducing valves 104 and 105. The proportional pressure reducing valves 104 and 105 are provided for taking a braking balance by reducing the braking pressure on the rear wheels (tires RR and RL) proportionally as compared with that on the front wheels (tires FR and FL) in accordance with a reduction of the load on the rear wheels at the time of brake control.

The normally open solenoid valves 83, 84, 89 and 90, normally closed solenoid valves 85, 86, 91 and 92, motor 99, proportional pressure reducing valves 104 and 105, etc. are controlled by an electronic control unit (ECU) 106. The brake system 70 has the brake lights 51 and switches 52 controlled by ECU 106.

When brake operation is effected by the driver stepping on the brake pedal 61, the normally open solenoid valves 83, 84, 89 and 90 are opened, the normally closed solenoid valves 85, 86, 91 and 92 are closed and the pumps 100 and 101 are stopped, in accordance with the signals from ECU 106. As a result, the master cylinder 76 is connected with the wheel cylinders 81, 82, 87 and 88 and the master cylinder pressure Pm is supplied to the wheel cylinders 81, 82, 87 and 88 to produce a braking force corresponding to the force with which the brake is stepped on by the driver.

At the time of antilock control, the pumps 100 and 101 are energized in accordance with the signals from ECU 106 and the normally open solenoid valves 83, 84, 89 and 90 and the normally closed solenoid valves 85, 86, 91 and 92 are opened or closed in an appropriate way. As a result, the wheel cylinders 81, 82, 87 and 88 have their pressure increased, reduced or maintained in an appropriate way. For example, if it has been found that the tire FR appears to be unnecessarily locked, the normally open solenoid valve 83 is energized to close and the normally closed solenoid valve 85 is energized to open. As a result, a part of the braking liquid pressure in the liquid pressure line 77 flows out into the auxiliary reservoir 103, whereby the braking force on the tire FR is reduced. The liquid stored in the auxiliary reservoir 103 is returned to the liquid pressure line 77 by the pump 101.

ECU 106 controls the throttle valve 107 in the internal combustion engine 73 from its totally closed position to its totally open position in accordance with the degree in which the accelerator pedal 71 is stepped on. An increase in the opening of the throttle valve 107 leads to an increase in the rotating speed of the internal combustion engine 73 and thereby in the vehicle driving force.

Figure 9:
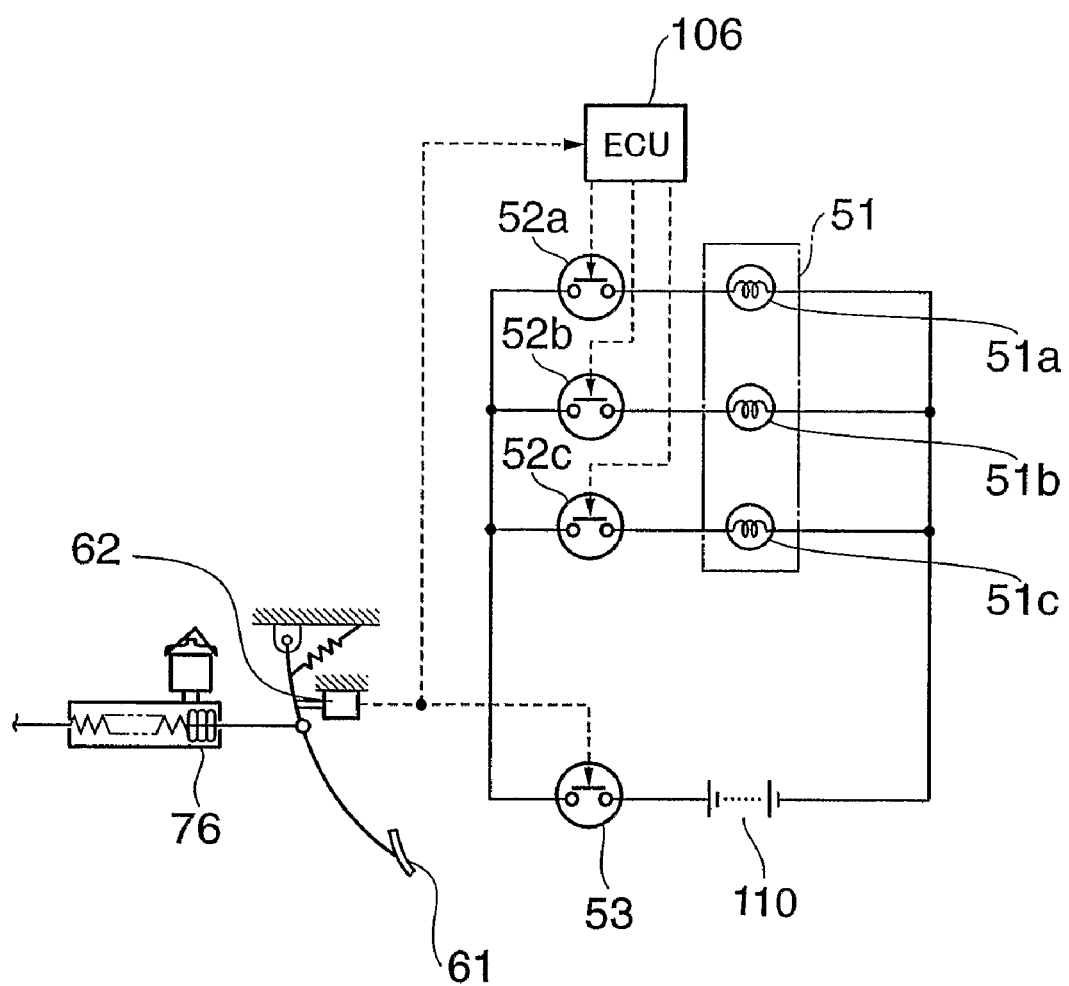
FIG. 9 is a schematic diagram showing the relation of a brake pedal, brake lights and a brake light control apparatus.

FIG. 9 is a diagram showing the relation of the brake pedal, brake light and brake light control. The brake light control system is composed of the braking pressure sensor 62, ECU 106, switches 52a, 52b, 52c and 53 controlled by ECU 106, brake light 51 having the lighting units 51a, 51b and 51c driven by those switches, and a battery 110. The brake stepping force sensor 62 detects the stepping force on the pedal 61 and transmits the detected brake stepping force to ECU 106. ECU 106 outputs a voltage signal in accordance with the brake stepping force as shown in FIG. 6. The output voltage signal turns on one of the switches and thereby the corresponding brake light. More specifically, the lighting unit 51a is turned on when the input voltage is from 0.5 to 1.5 V, the lighting unit 51b is turned oil when the input voltage is from 1.5 to 2.5 V and the lighting unit 51c is turned on when the input voltage is 2.5 V or above, as shown in Table 1.

Figure 10:
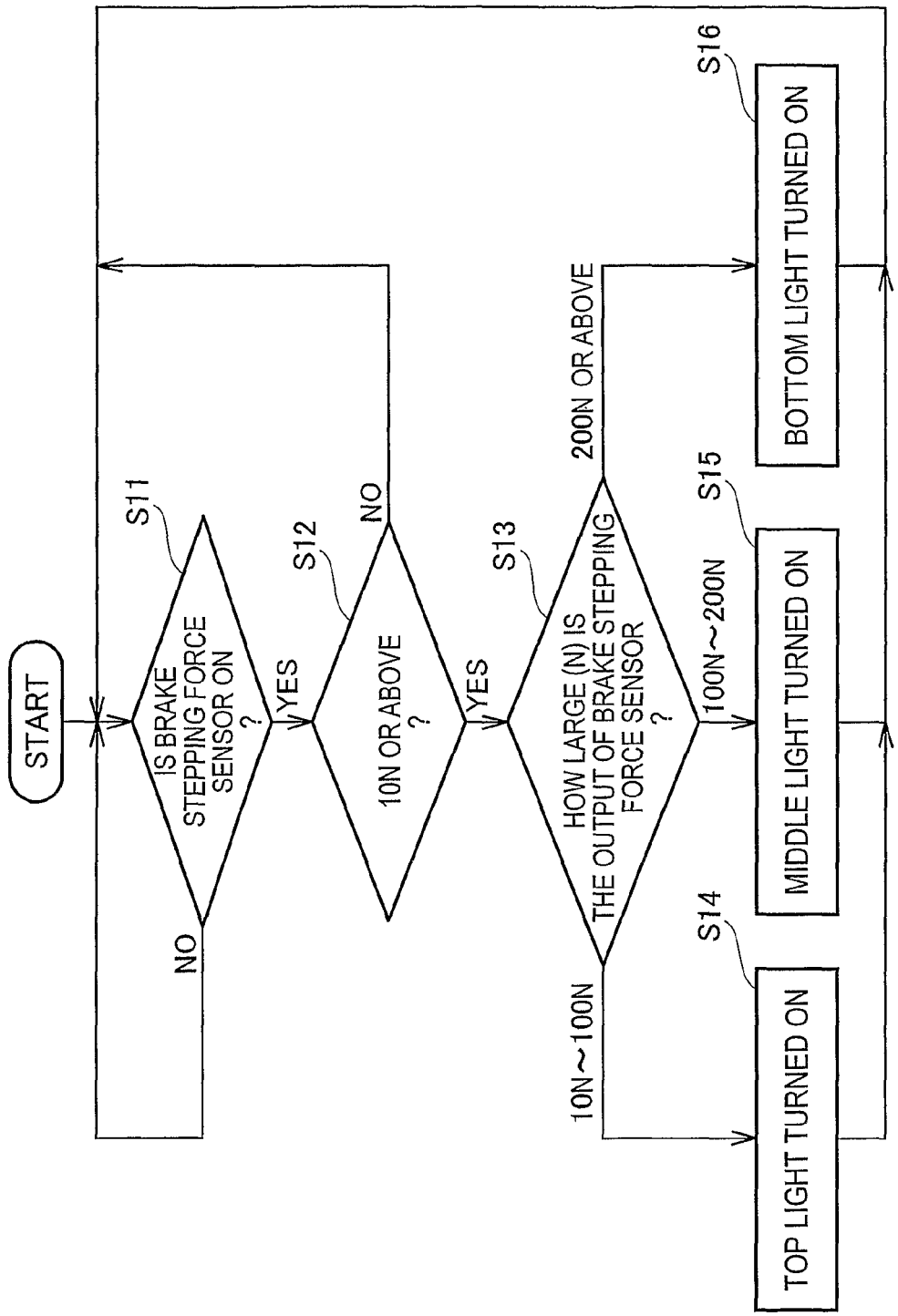
FIG. 10 is a flowchart showing the flow of processing by the brake light control apparatus in ECU.

FIG. 10 is a flowchart showing the flow of processing by the brake light control apparatus 60 in ECU 106. The control apparatus 60 starts processing upon turning on of an ignition switch and makes judgment as to whether the brake stepping force sensor 62 is ON (Step S11). If the brake stepping force sensor 62 is not ON, it repeats Step S11. If the sensor is ON, it makes judgment as to whether the brake stepping force detected by its sensor 62 is 10 N or above (Step S12). If the force is not 10 N or above, it returns to Step S11. If the force is 10 N or above, it makes judgment as to the output of the brake stepping force sensor 62 (Step S13). If the output is from 10 to 100 N, it turns on the top lighting unit (Step S14). If the output is from 100 to 200 N, it turns on the middle lighting unit (Step S15). If the output is 200 N or above, it turns on the bottom lighting unit (Step S16). Then, it returns to Step S11.

Figure 11:
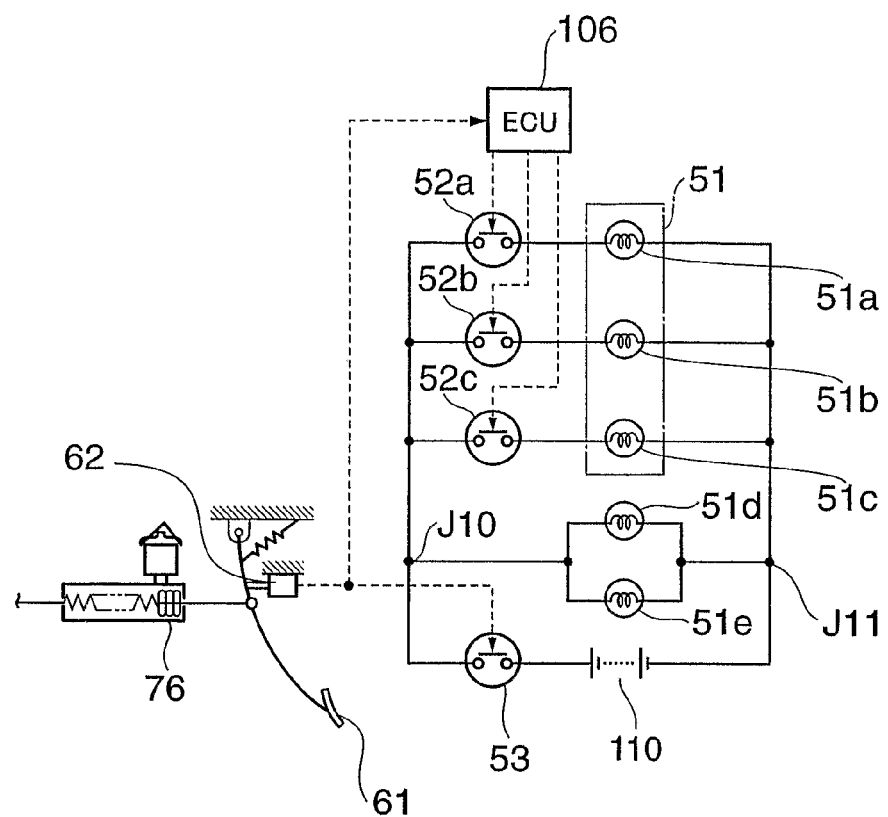
FIG. 11 is a diagram similar to FIG. 9, but illustrating the control of a brake light system including brake lights installed separately on the upper portion of the rear of the vehicle shown in FIG. 3.

FIG. 11 is a diagram similar to FIG. 9, but illustrating the control of a brake light system including brake lights (red) installed separately on the upper portion of the rear of the vehicle shown in FIG. 3. This system has lighting units or normally-on brake lights 51d and 51e connected with terminals J10 and J11 on the upper portion of the vehicle in addition to the lighting units shown in FIG. 9. According to this example, the uppermost normally-on brake lights 51d and 51e are adapted to be turned on whenever the switch 53 is turned on as a result of the detection of brake operation by the brake stepping force sensor 62 in FIG. 11. This makes the brake lights still more effective.

The brake light does not necessarily have to be divided in three units, but may also be divided in a different number of units. The larger the number of units in which the brake light is divided, the more effectively its lighting can be continued. In the event of sudden brake operation, it will be beneficial for all of the brake lights (three according to the example under description) to be turned on to draw still stronger attention of the driver of any car behind. It will also be beneficial to install other brake lights (for example, high-mount brake lights) so that the other brake lights (normally-on brake lights) may be turned on whenever the brake has been operated, irrespective of the brake stepping force. It will also be effective to employ a light-emitting pattern in which the light-emitting surfaces have an area making a continuous and gradual downward and outward increase, so that the amount of light, the size of the light-emitting area, its vertical length, etc. may draw still stronger attention. It will further be effective to connect brake lights operationally with a backward directed radar or a backward directed onboard camera so that when a car is at a shorter distance from a car behind, it may have a lower light than normal turned on to draw still stronger attention. It may also be useful to calculate the rate at which the brake stepping force rises, so that if any sharp rise has been detected, it may be considered as sudden braking and allow a lower light than normal to be turned on to draw still stronger attention. Moreover, the brake lights may be known electric bulbs, or other light-emitting devices, such as LED's.

Figure 12:
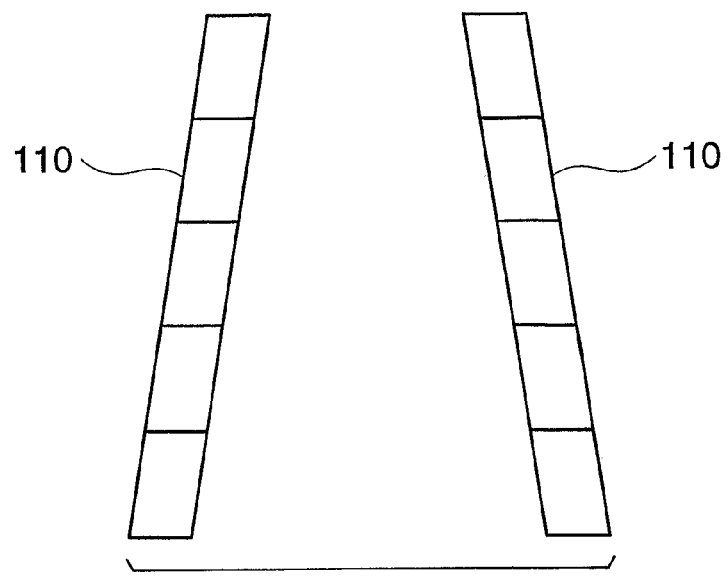
FIG. 12 is a diagram showing a vehicle brake light system according to a second embodiment of this invention.
Figure 13:
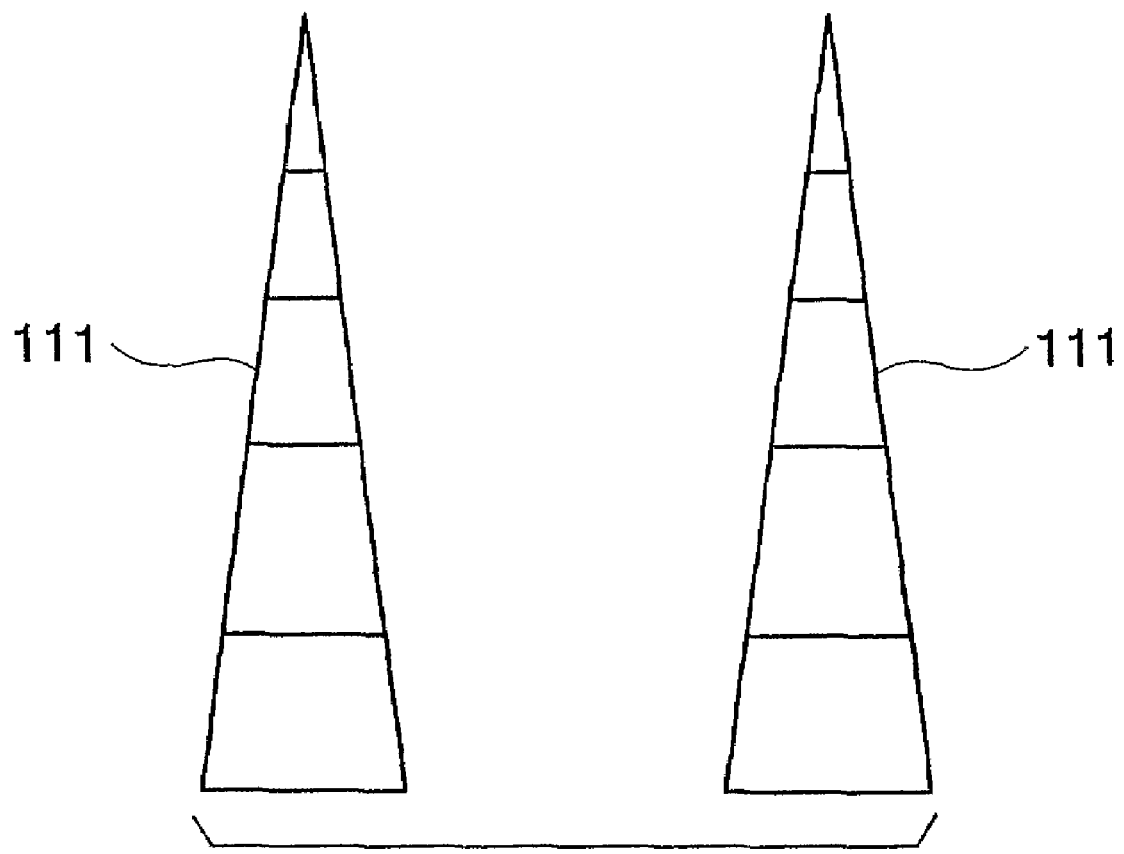
FIG. 13 is a diagram showing a vehicle brake light system according to a third embodiment of this invention.

According to this invention, the lights are not limited to those shown in FIG. 7, but various forms of modifications will be possible. FIGS. 12 and 13 are diagrams showing the second and third embodiments, respectively, of this invention. The brake lights 110 shown in FIG. 12 are so arranged that a lower pair of right and left lighting units may have a larger spacing between their centers of gravity, though all of the individual lighting units are identical in size and shape. The brake lights 111 shown in FIG. 13 are each so shaped that a lower lighting unit may have a larger area, though every pair of right and left lighting units have the same spacing between their centers of gravity. It should be understood that the present invention does not require fulfillment of all of the three factors, namely, as a braking force grows in scale, a) lower level lighting units are turned on; b) spacing between corresponding right and left lighting units turned on becomes larger; and c) areas of the lighting units turned on become larger, and that the invention may be accomplished when one of the factors is satisfied.

Although the brake light control program as shown in FIG. 10 has been described as being stored in ECU 106, it will also be possible to supply any brake light control program from outside in the form of a recording medium, such as CD-ROM, when it is required. Although the lighting units have been described as being in the form of a triangle, trapezoid or parallelogram, it will also be possible to form the lighting units in any other shape, such as oval, rectangular or arrow. Moreover, the principle of this invention is not only limited to four-wheeled motor vehicles, but is also applicable to other vehicles, such as two- or three-wheeled motor vehicles.

INDUSTRIAL APPLICABILITY

This invention provides an improved vehicular brake light system and hence is useful in the automotive vehicle manufacture industry.

The invention claimed is:

1. A vehicle brake light system including a row of vertically arranged lighting units on each of right and left sides of a vehicle rear part, characterized in that
the lighting units are disposed such that a lower positioned one of the lighting units of one row has a greater distance between a center of gravity thereof and a center of gravity of a corresponding one of the lighting units of the other row, and
the lighting units are adapted to function such that the lower positioned lighting units are turned on as a braking force applied to a brake pedal becomes larger.

2. The brake light system of claim 1, wherein all of its lighting units are turned on when the braking force has exceeded a given value.

3. The brake light system of claim 1, further including a normally-on brake light which is turned on whenever the braking force is applied to the brake pedal.

4. A vehicle brake light system having a row of vertically arranged lighting units on each of right and left sides of a vehicle rear part, characterized in that
lower positioned ones of the lighting units have larger areas than higher positioned ones of the lighting units, and
the lighting units are adapted to function such that the lower positioned lighting units are turned on as a braking force applied to a brake pedal becomes larger.

5. The brake light system of claim 4, wherein all of its lighting units are turned on when the braking force has exceeded a given value.

6. The brake light system of claim 4, further including a normally-on brake light which is turned on whenever the braking force is applied to the brake pedal.

7. A control apparatus for a vehicle brake light system having a row of vertically arranged lighting units on each of right and left sides of a vehicle rear part, the lighting units being disposed such that a lower positioned one of the lighting units of one row has a greater distance between a center of gravity thereof and a center of gravity of a corresponding lower positioned one of the lighting units of the other row, the lighting units being adapted to function such that the lower positioned lighting units are turned on as a braking force applied to a brake pedal becomes larger, the control apparatus comprising:
braking force detecting means for detecting at least one of a brake stepping force, a braking pressure and an amount of pedal operation;
operating means for producing a signal corresponding to the braking force detected by the braking force detecting means; and
lighting unit control means for controlling the turning on and off of the lighting units in correspondence with the signal produced by the operating means, such that the lower positioned lighting units are turned on as the braking force becomes larger.

8. The control apparatus of claim 7, wherein the operating means produces a signal for turning on all of the lighting units when the braking force has exceeded a given value.

9. The control apparatus of claim 7, wherein the operating means produces a signal for turning on a normally-on brake light whenever the braking force is applied to the brake pedal.

10. A control apparatus for a vehicle brake light system having a row of vertically arranged lighting units on each of right and left sides of a vehicle rear part, lower positioned ones of the lighting units having larger areas than higher positioned ones of the lighting units, the lighting units being adapted to function such that the lower positioned lighting units are turned on as a braking force applied to a brake pedal becomes larger, the control apparatus comprising:
braking force detecting means for detecting at least one of a brake stepping force, a braking pressure and an amount of pedal operation;
operating means for producing a signal corresponding to the braking force detected by the braking force detecting means; and
lighting unit control means for controlling the turning on and off of the lighting units in correspondence with the signal produced by the operating means, such that the lower positioned lighting units are turned on as the braking force becomes larger.

11. The control apparatus of claim 10, wherein the operating means produces a signal for turning on all of the lighting units when the braking force has exceeded a given value.

12. The control apparatus of claim 10, wherein the operating means produces a signal for turning on a normally-on brake light whenever the braking force is applied to the brake pedal.

13. A vehicle brake light system control program for having a lighting control apparatus control a vehicle brake light system having a plurality of lighting units arranged in a horizontally and vertically spaced apart relation on the rear of a vehicle so that horizontally spaced apart lighting units which are lower in position may have a greater distance between their centers of gravity, characterized by including a process for having braking force detecting means detect at least one of a brake stepping force, a braking pressure and the amount of pedal operation, a process for having operating means produce a signal altered progressively in accordance with the braking force as detected by the braking force detecting means and a process for having lighting unit control means control the turning on or off of the lighting units in accordance with the signal produced by the operating means, so that the lighting unit which is lower in position may be turned on as the braking force becomes larger.

14. The vehicle brake light system control program of claim 13, wherein the operating means is caused to produce a signal for turning on all of the lighting units when the braking force as obtained by the braking force detecting means has exceeded a given value.

15. The vehicle brake light system control program of claim 13, wherein the operating means is caused to produce a signal for turning on a normally-on brake light whenever the braking force is applied to the brake pedal.

16. A vehicle brake light system control program for having a lighting control apparatus control a vehicle brake light system having a plurality of lighting units arranged in a vertically spaced apart relation on the rear of a vehicle so that one which is lower in position may have a larger area, characterized by including a process for having braking force detecting means detect at least one of a brake stepping force, a braking pressure and the amount of pedal operation, a process for having operating means produce a signal altered progressively in accordance with the braking force as detected by the braking force detecting means and a process for having lighting unit control means control the turning on or off of the lighting units in accordance with the signal produced by the operating means, so that the lighting unit which is lower in position may be turned on as the braking force becomes larger.

17. The vehicle brake light system control program of claim 16, wherein the operating means is caused to produce a signal for turning on all of the lighting units when the braking force as obtained by the braking force detecting means has exceeded a given value.

18. The vehicle brake light system control program of claim 16, wherein the operating means is caused to produce a signal for turning on a normally-on brake light whenever the braking force is applied to the brake pedal.

* * * * *

UNITED STATES PATENT AND TRADEMARK OFFICE
CERTIFICATE OF CORRECTION

PATENT NO. : 7,573,378 B2
APPLICATION NO. : 11/661787
DATED : August 11, 2009
INVENTOR(S) : Yoshiyuki Matsumoto et al.

It is certified that error appears in the above-identified patent and that said Letters Patent is hereby corrected as shown below:

On the Title Page:

At item (75), Inventors, please change:

"Hirosni Uematsu, Wako (JP)" to -- Hiroshi Uematsu, Wako (JP) --.

Signed and Sealed this

Ninth Day of November, 2010

David J. Kappos
*Director of the United States Patent and Trademark Office*